United States Patent
Morita

(10) Patent No.: US 7,822,295 B2
(45) Date of Patent: Oct. 26, 2010

(54) IMAGE PROCESSING APPARATUS, IMAGE SEARCHING METHOD, AND PROGRAM

(75) Inventor: Hiroyasu Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 991 days.

(21) Appl. No.: 11/608,645

(22) Filed: Dec. 8, 2006

(65) Prior Publication Data

US 2007/0150453 A1 Jun. 28, 2007

(30) Foreign Application Priority Data

Dec. 26, 2005 (JP) .............................. 2005-373444

(51) Int. Cl.
*G06K 9/36* (2006.01)
(52) U.S. Cl. ..................................................... 382/305
(58) Field of Classification Search ........................ None
See application file for complete search history.

(56) References Cited

U.S. PATENT DOCUMENTS 6,584,463 B2 * 6/2003 Morita et al. .................. 707/3
6,813,618 B1 * 11/2004 Loui et al. ..................... 707/5
7,356,778 B2 * 4/2008 Hooper et al. ............. 715/841
2002/0059215 A1 5/2002 Kotani et al.
2003/0037050 A1 * 2/2003 Monteverde .................... 707/6

FOREIGN PATENT DOCUMENTS

JP 2002-202975 A 7/2002

* cited by examiner

*Primary Examiner*—Brian P Werner
(74) *Attorney, Agent, or Firm*—Canon U.S.A., Inc. I.P. Division

(57) ABSTRACT

A processing apparatus and method for selecting images, the apparatus and method including displaying a catalog of a plurality of images on an image display device, obtaining information when at least one image is selected from the plurality of displayed images, the information relating to an image corresponding to the selected image, and displaying a menu on the image display device in association with the selected image, the menu including an option for executing searching based on the obtained information.

21 Claims, 16 Drawing Sheets

Search

Search for post-processing JPEG images

. . . . . . . . . .

Cut

Copy

Paste

Search

Search for post-processing JPEG images

. . . . . . . . . .

Search for pre-editing or post-editing JPEG images

. . . . . . . . . .

Cut

Copy

Paste

Search for unprocessed RAW images

··········

Cut

Copy

Paste

Search

Search for post-processing JPEG images

. . . . . . . . . .

Search for pre-resizing JPEG images

. . . . . . . . . .

Search for JPEG images
shot on the same date

. . . . . . . . . .

Cut

Copy

Paste

. . . . . . . . . .

IMAGE PROCESSING APPARATUS, IMAGE SEARCHING METHOD, AND PROGRAM

BACKGROUND OF THE INVENTION

1. Field of the Invention

The present invention relates to image processing apparatuses, image searching methods, and programs. More specifically, the present invention relates to an image processing apparatus operable with an image display device, an image searching method used for image processing executed by the image processing apparatus, and a program for causing a computer to execute the image searching method.

2. Description of the Related Art

In image processing apparatuses that store image data on storage media so that image data can be retrieved and displayed or various types of image processing can be executed on the image data as needed, the capacity of storage media and the speed of image processing have been increasing. Thus, it is now possible to deal with a large number of images. However, it is not easy to find image data desired by a user from a large number of pieces of image data stored on a storage medium.

In view of the situation described above, data searching devices dedicated to image searching have been proposed (e.g., Japanese Patent Laid-Open No. 2002-202975). In such a data searching device, search target data including image data and metadata (attribute information attached to associated image data, e.g., EXIF information) is stored. When a user has selected an image that serves as a reference image, metadata attached to the image is retrieved, and the search-target data is searched using the metadata.

As an example of searching that is executed using information attached to an image, it is possible to execute searching based on a parameter that is set to the image in advance by the user.

However, the data searching device according to the related art is not associated with an image display device. Image searching is a function that is used when a user is browsing images on an image display device, so that it is desired that image searching can be executed as a part of the functionality of an image display device.

Furthermore, in the data searching device according to the related art, in addition to searching for images (e.g., JPEG images) having metadata that is the same as metadata of a reference image (i.e., JPEG image), it is desired that the following types of image searching be readily allowed:

Searching for a pre-processing (pre-conversion) RAW image based on a JPEG image
Searching for post-processing (post-conversion) JPEG images based on a RAW image
Searching for post-editing JPEG images based on a JPEG image
Searching for pre-editing JPEG images based on a JPEG image
Searching for other JPEG images based on a JPEG image corresponding to the same post-processing RAW image
Searching for RAW images that have not yet been processed (converted) into JPEG images

SUMMARY OF THE INVENTION

The present invention is directed to providing an image processing apparatus and method that overcomes the disadvantages of current image searching approaches.

In one aspect of the present invention, an image processing apparatus operable with an image display device includes a first display unit configured to display a catalog of a plurality of images on the image display device, an obtaining unit configured to obtain information when at least one image is selected from the plurality of images displayed on the image display device, the information relating to an image corresponding to the selected image, and a second display unit configured to display a first menu on the image display device in association with the selected image, the first menu including an option for executing searching based on the obtained information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the description, serve to explain the principles of the invention.

FIG. 6 is an illustration of a RAW-image menu, which is displayed beside a RAW image selected by right-clicking from a plurality of images displayed in an image display section.

FIG. 11 is an illustration of a JPEG-image menu.

FIG. 14 is an illustration of a folder menu.

FIG. 16 is an illustration of an example of menu options in a second exemplary embodiment of the present invention.

DESCRIPTION OF THE EMBODIMENTS

First Exemplary Embodiment

Figure 1:
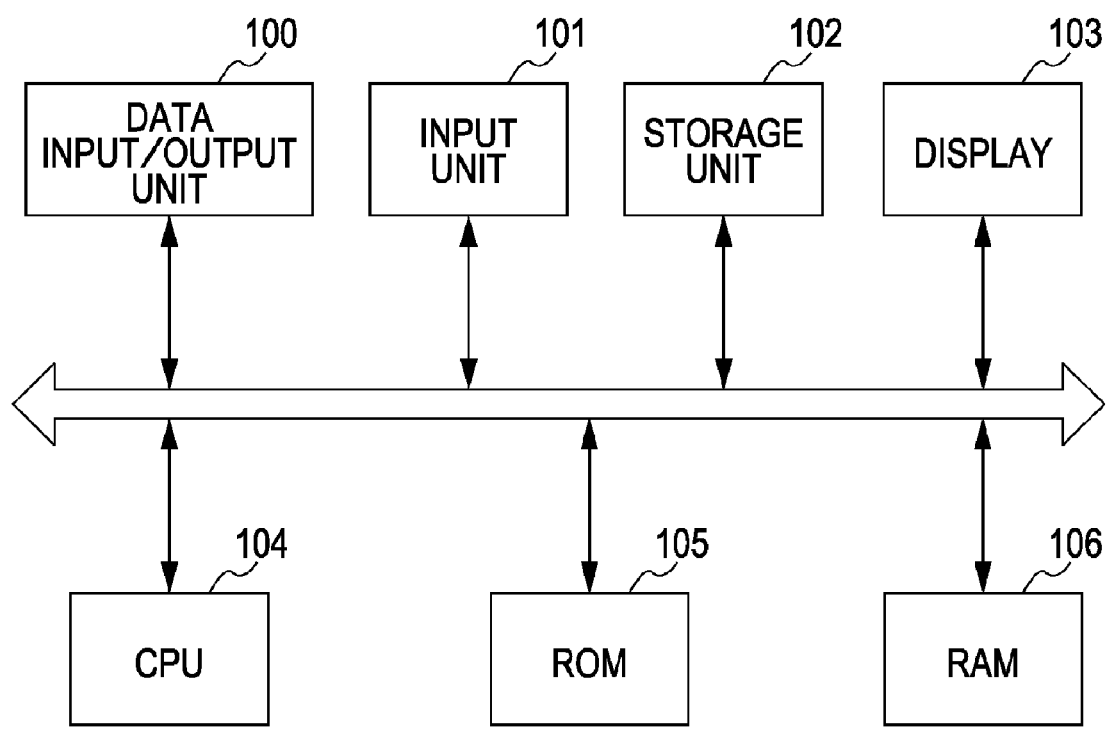
FIG. 1 is a block diagram illustrating the configuration of an image processing apparatus according to a first exemplary embodiment of the present invention.

FIG. 1 is a block diagram illustrating the configuration of an image processing apparatus according to a first exemplary embodiment of the present invention.

Referring to FIG. 1, a data input/output unit 100 reads data, such as an image captured by a digital camera or the like, from a memory card or the like having the data stored thereon, via a PC card adaptor, a USB (Universal Serial Bus) bus, or the like. Also, the data input/output unit 100 writes data, such as an image, to a memory card or the like. An input unit 101 includes a keyboard and a pointing device, and it is used to input user's instructions or data. The pointing device may be, for example, a mouse, a trackball, or a tablet.

A storage unit 102 is implemented, for example, by a hard disk, and it stores binary data or the like. A display 103 is implemented, for example, by a CRT display or a liquid crystal display, and it displays images, such as GUI (Graphical User Interface) screens.

A CPU (Central Processing Unit) 104 exercises control on overall processing involving the components described above. A ROM (Read-Only Memory) 105 stores control programs and data used for various types of processing. A RAM (Random Access Memory) 106 provides the CPU 104 with work areas used for various types of processing. The control programs may alternatively be stored on the storage unit 102. In that case, the control programs are loaded in the RAM 106 and then executed by the CPU 104.

Figure 2:
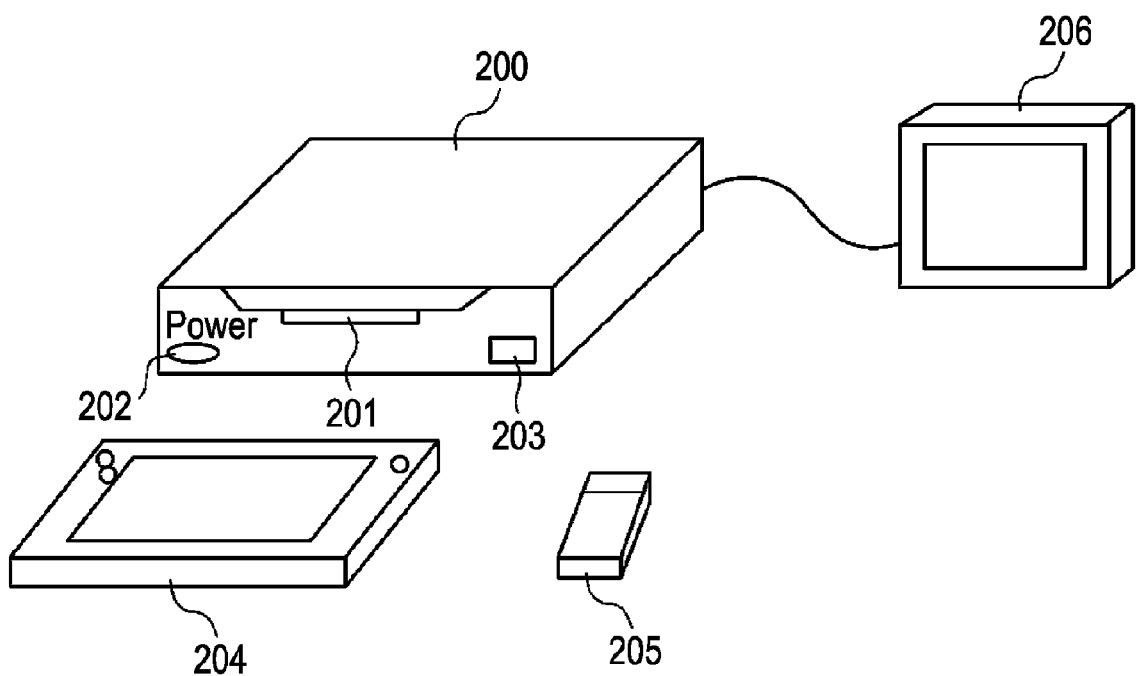
FIG. 2 is an external view of the image processing apparatus illustrated in FIG. 1.

FIG. 2 is an external view of the image processing apparatus illustrated in FIG. 1. Referring to FIG. 2, on a front face of an image processing apparatus 200, a PC card slot 201 is provided. The image processing apparatus 200 receives input of image data from a memory card via a PC card adaptor inserted in the PC card slot 201.

A power switch 202 is used to power on or power off the image processing apparatus 200. An infrared photoreceptor 203 receives signals input from a wireless keyboard 204 and a remote controller 205. The wireless keyboard 204 and the remote controller 205 are included in the input unit 101 illustrated in FIG. 1.

On a rear face of the image processing apparatus 200, a display output terminal (not shown) is provided, to which a display device 206, such as a CRT display or a liquid crystal display, is connected. The display device 206 serves as the display 103 illustrated in FIG. 1. Although not shown, the image processing apparatus 200 also has a USB terminal for connecting to USB devices, such as a digital camera, and network connection terminal for connecting to a network.

Figure 3:
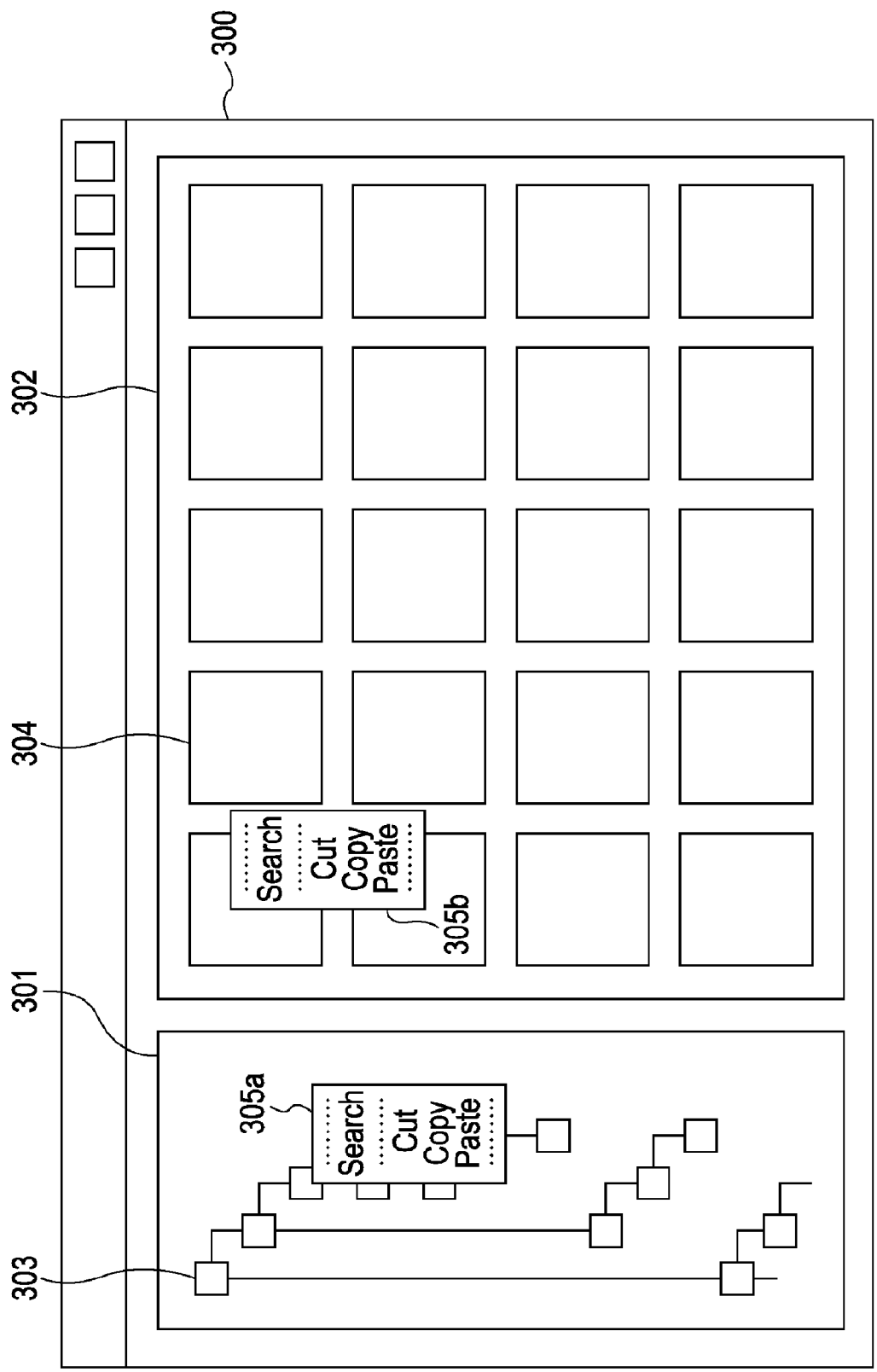
FIG. 3 is an illustration of a screen that is displayed on a display device illustrated in FIG. 2.

FIG. 3 is an illustration of a screen 300 that is displayed on the display device 206 illustrated in FIG. 2. The screen 300 includes an explorer section 301 that displays a hierarchy of folders 303, and an image display section 302 that displays a plurality of images 304 contained in a folder that is selected in the explorer section 301. In the present embodiment, desired images are searched for using the screen 300 illustrated in FIG. 3. More specifically, when a user has selected one of a plurality of images or one of a plurality of folders displayed on the screen 300 and right-clicks on the selected item, a dialog illustrating options representing types of processing that can be executed on the selected item is displayed.

One type of processing includes a plurality of types of searching, and when one of the types of searching is executed, the selected type of searching is executed. The types of searching include, but are not limited to the following: searching for images satisfying a search condition that is set based on attached information of a selected image, searching for post-processing images corresponding to a selected RAW image, and searching for a pre-processing RAW image corresponding to a selected post-processing image; searching for images in corresponding relationships, such as images created by further editing a selected post-processing image or an original image before editing of a selected post-processing image that has already been edited; and searching for unprocessed RAW images contained in a selected folder. A RAW image may be directly stored in the storage unit 102, or a RAW image may be processed and converted into a JPEG image so that the JPEG image is stored in the storage unit 102.

Images obtained by processing RAW images may be in various file formats, such as BMP, TIFF, PICT, GIF, JBIG, PNG, and FlashPix. Among these, the present embodiment, for description purposes, will be described in the content of images in the JPEG format (hereinafter referred to as JPEG images). Any of the other formats however can be used to practice the present invention.

As the attached information of an image, EXIF (Exchangeable Image File Format) information is used. The EXIF information includes imaging parameters, such as a Date Time Original, an Iso Speed Ratings, and a shutter speed. When searching is directed to a JPEG image, the attached information also includes information representing corresponding relationship between the JPEG image and a pre-processing RAW image. When searching is directed to a RAW image, the attached information also includes information representing corresponding relationship between the RAW image and a post-processing JPEG image. Such information representing corresponding relationship is described using, for example, a manufacturer note of TIFF (Tagged Image File Format).

Figure 4:
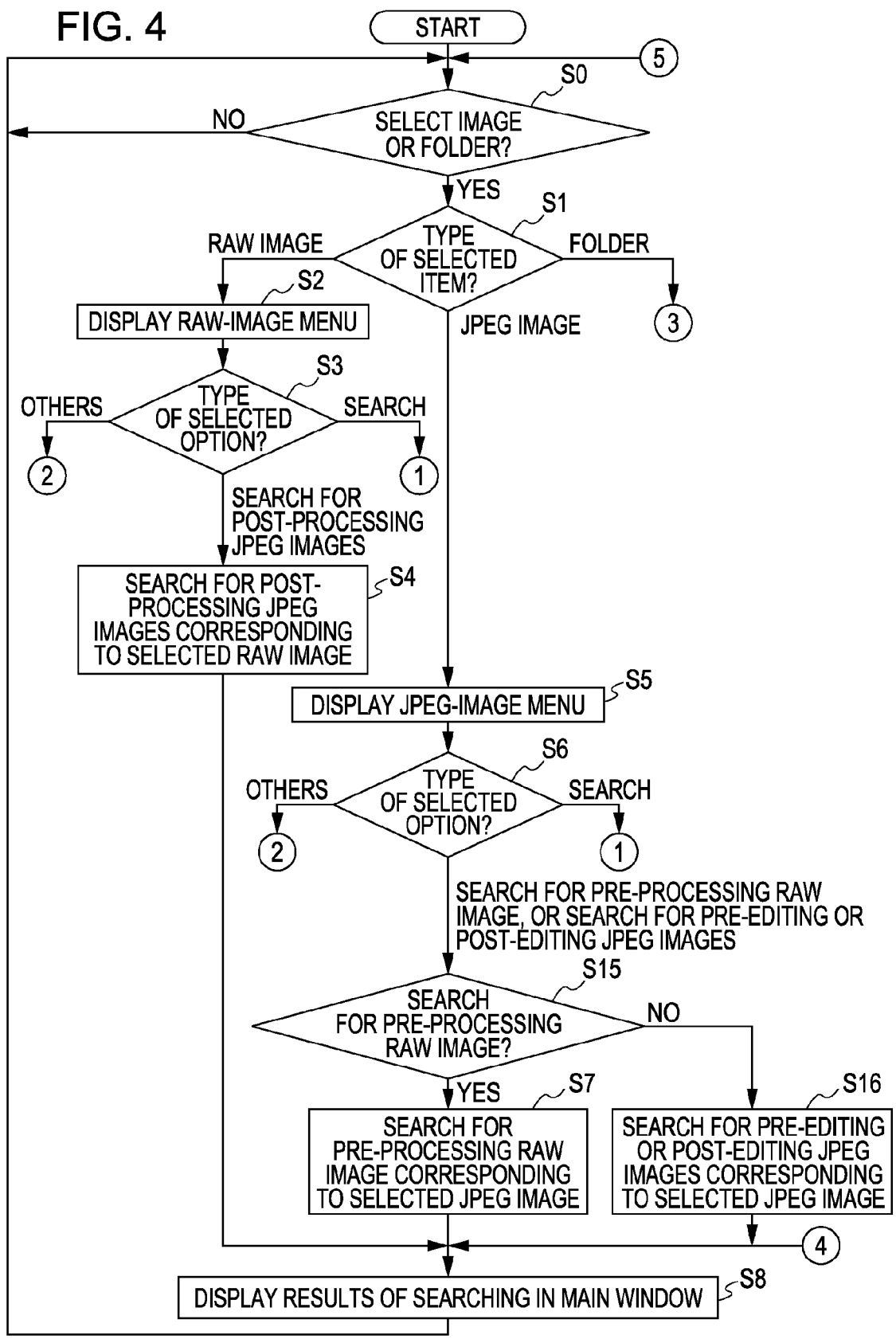
FIG. 4 is a flowchart illustrating the procedure of an image searching and displaying process that is executed using the screen illustrated in FIG. 3.
Figure 5A:
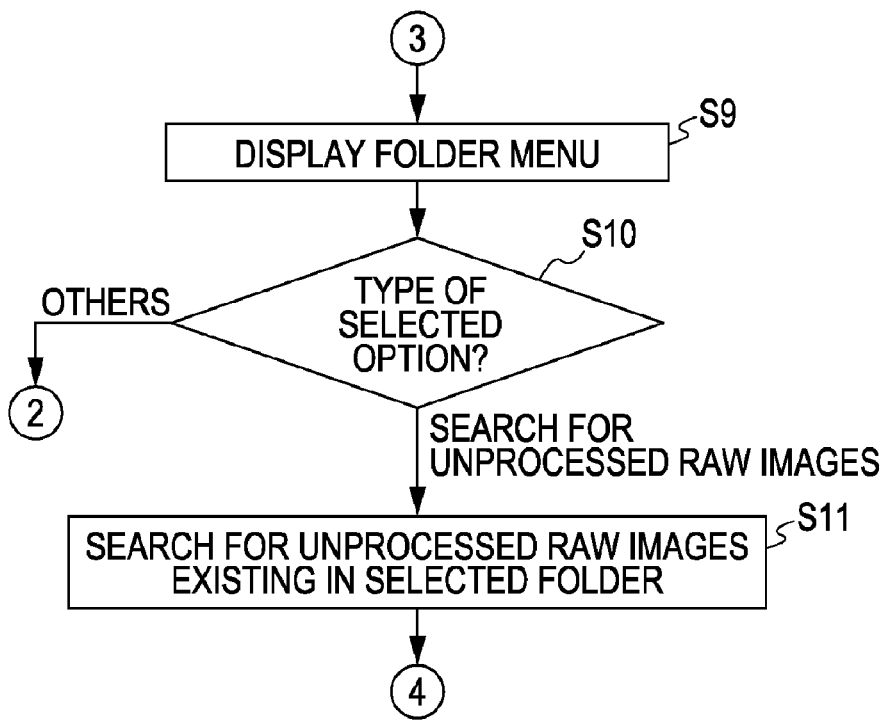
FIGS. 5A and 5B are flowcharts illustrating the procedure of the image searching and displaying process that is executed using the screen illustrated in FIG. 3.
Figure 5B:
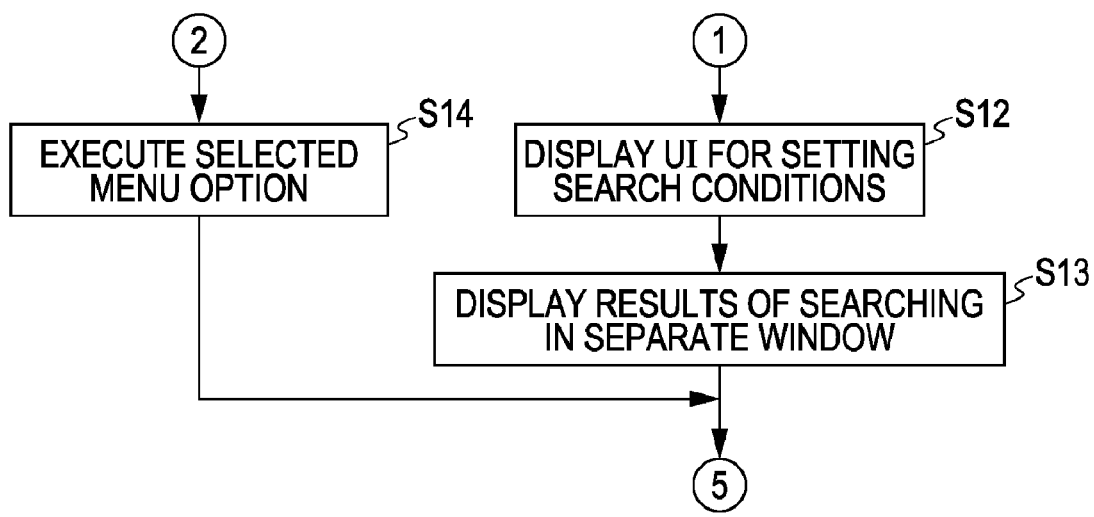

FIG. 4 and FIGS. 5A and 5B are flowcharts illustrating the procedure of an image searching and displaying process executed using the screen 300 illustrated in FIG. 3. The image searching and displaying process is executed through execution of a control program by the CPU 104.

Upon invocation of the image searching and displaying process, the screen 300 is displayed on the display device 206. In the image display section 302 of the screen 300, images that had been displayed in the image display section 302 at the end of a last execution of the image searching and displaying process are displayed. Then, when a folder in the explorer section 301 is selected, a catalog of images existing in the folder is displayed in the image display section 302.

Referring to FIG. 4, in step S0, a check is made whether the user has selected and right-clicked on an image displayed in the image display section 302 or a folder displayed in the explorer section 301. If an image or folder is selected and right-clicked on, the process proceeds to step S1. In step S1, it is determined whether the selected item is a RAW image, a JPEG image, or a folder. The process proceeds to step S2 when the selected item is a RAW image, to step S5 when the selected item is a JPEG image, to step S9 when the selected item is a folder. The distinction between a RAW image and a JPEG image is determined with reference to a header file of the selected image.

In step S2, a RAW-image menu is displayed. More specifically, when one of a plurality of images displayed in the image display section 302 has been selected and right-clicked on, a menu 305b is displayed beside the selected image, as shown in FIG. 3. FIG. 6 is an illustration of a RAW-image menu 400, which is displayed beside a RAW image selected by right-clicking from a plurality of images displayed in the image display section 302.

The RAW-image menu 400 includes "Search" and "Search for post-processing JPEG images" as well as ordinary menu items such as "cut", "copy", and "paste". "Search" allows the user to set search conditions using the attached information of the RAW image selected by right-clicking, thereby searching for RAW images satisfying the search conditions. "Search for post-processing JPEG images" is used to search for post-processing JPEG images corresponding to the RAW image selected by right-clicking.

Next, in step S3, it is determined which option in the RAW-image menu 400 has been selected by the user. The process proceeds to step S4 when "Search for post-processing JPEG images" has been selected, to step S12 (FIG. 5B) when "Search" has been selected, and to step S14 (FIG. 5B) when any other option has been selected. In step S14, processing corresponding to the selected option (e.g., cut, copy, or paste) is executed. The process then returns to step S0.

In step S4, from JPEG images obtained by processing a plurality of RAW images and stored in the storage unit 102, post-processing JPEG images corresponding to the RAW image selected by right-clicking are searched for. For example, in a method of searching for post-processing JPEG images corresponding to the RAW image selected by right-clicking, an ID uniquely identifying the RAW image, stored at an address in the file, is used for comparison. When a RAW image is processed into a JPEG image, an ID uniquely identifying the RAW image is generated upon creating a first JPEG file, and the ID uniquely identifying the RAW image is written to the RAW file. The same ID is also written to the JPEG file. When a second or subsequent JPEG file is created, the existing ID stored in the RAW file is written to the JPEG file. When the RAW image or the JPEG image is selected by right-clicking, the CPU 104 obtains the ID from the image file and loads the ID in the RAM 106. This ID is compared with the IDs of a plurality of JPEG images stored in the storage unit 102. In another method, a file containing a plurality of pieces of information representing corresponding relationships between RAW images and post-processing JPEG images is stored in the storage unit 102, and the CPU 104 refers to this file each time a RAW image or a JPEG image is selected by right-clicking.

Figure 7:
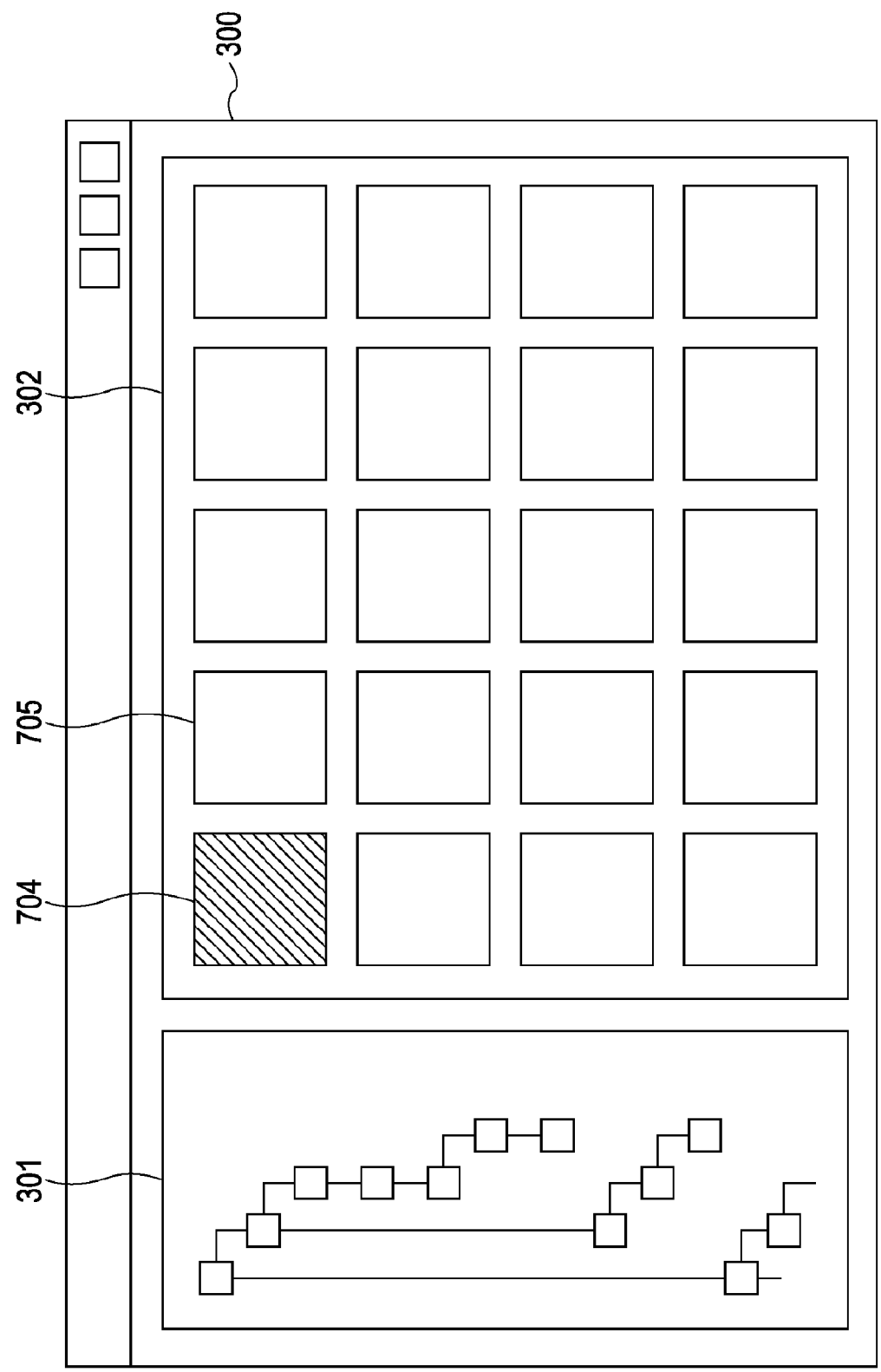
FIG. 7 is an illustration of a screen illustrating results of searching for post-processing JPEG images.

In step S8, the results of searching are displayed as illustrated in FIG. 7, and then the flow proceeds back to step S0. FIG. 7 is an illustration of the screen 300 illustrating results of searching for post-processing JPEG images. In the image display section 302 of the screen 300, a RAW image 704 selected by right-clicking (i.e., a RAW image that serves as a reference image) is displayed at the beginning (top left), and JPEG images 705 found as a result of searching are displayed on the right side of the RAW image 704.

Figure 8:
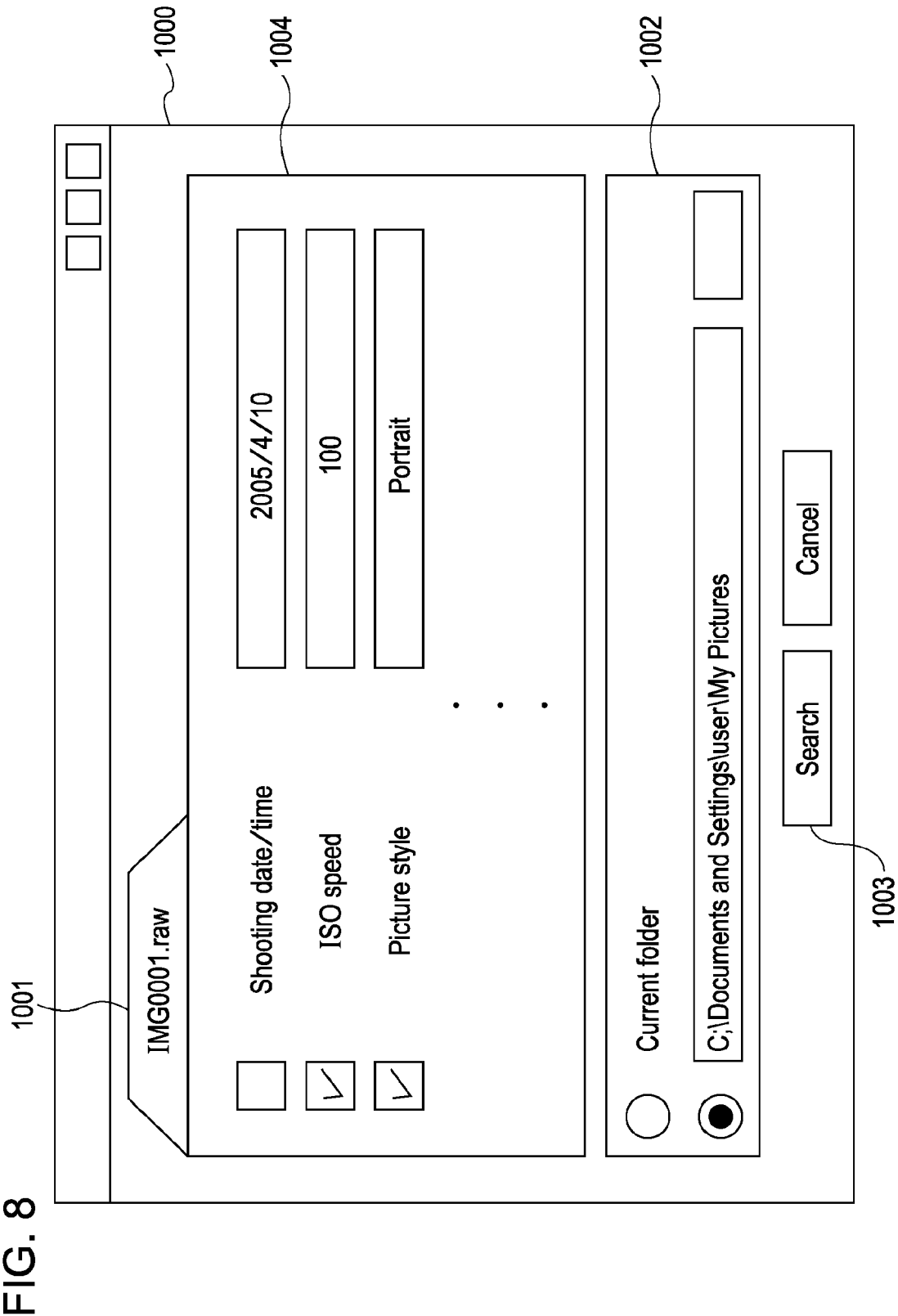
FIG. 8 is an illustration of an example of a search-condition setting window for searching that is executed using a RAW image as a reference image.

In step S12, a search-condition setting window is displayed based on the attached information of the RAW image selected by right-clicking. The user is prompted to set search conditions using the search-condition setting window so that RAW images satisfying the search conditions are searched for. FIG. 8 is an illustration of an example of a search-condition setting window 1000 for searching that is executed using a RAW image as a reference image.

In the search-condition setting window 1000, a file name (IMG.0001.raw) of the RAM image serving as a reference image appears on a search-condition tab 1001. In a search-condition input section 1004, search conditions and search values are written based on the attached information of the RAW image. The user sets search conditions by changing the search values or checking checkboxes in the search-condition input section 1004. Furthermore, in a search-folder specifying section 1002, a folder that is to be searched is specified. That is, it is specified whether the current folder is to be searched or an arbitrarily specified folder is to be searched. When a search start button 1003 is selected, searching is executed in the search range specified in the search-folder specifying section 1002 using the search conditions set in the search-condition input section 1004.

Figure 9:
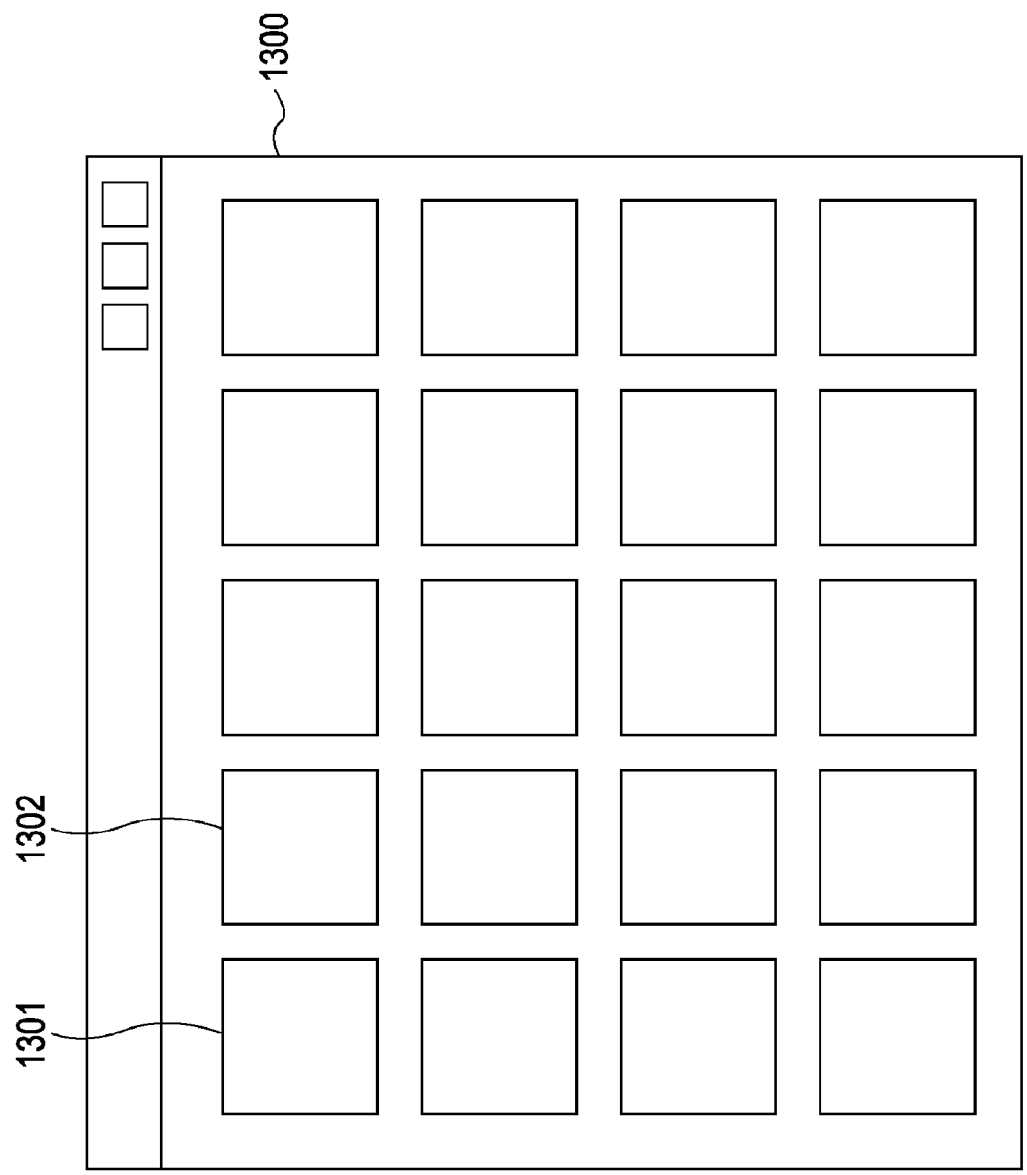
FIG. 9 is an illustration of a screen illustrating results of searching for RAW images.

Referring back to FIG. 5B, in step S13, the search results are displayed as illustrated in FIG. 9. In the screen 1300, a RAW image 1301 (a search reference image) selected by right-clicking is displayed at the beginning (top left), and a plurality of RAW images 1302, which are search result images, are displayed on the right side of the RAW image 1301.

In step S12 described above, searching is executed using one RAW image as a reference image. However, searching may be executed using a plurality of RAW images as reference images. In that case, searching is executed by specifying whether the attached information of all of the plurality of RAW images is to be included as search conditions or the attached information of at least one of the plurality of RAW images is to be included as search conditions.

Figure 10:
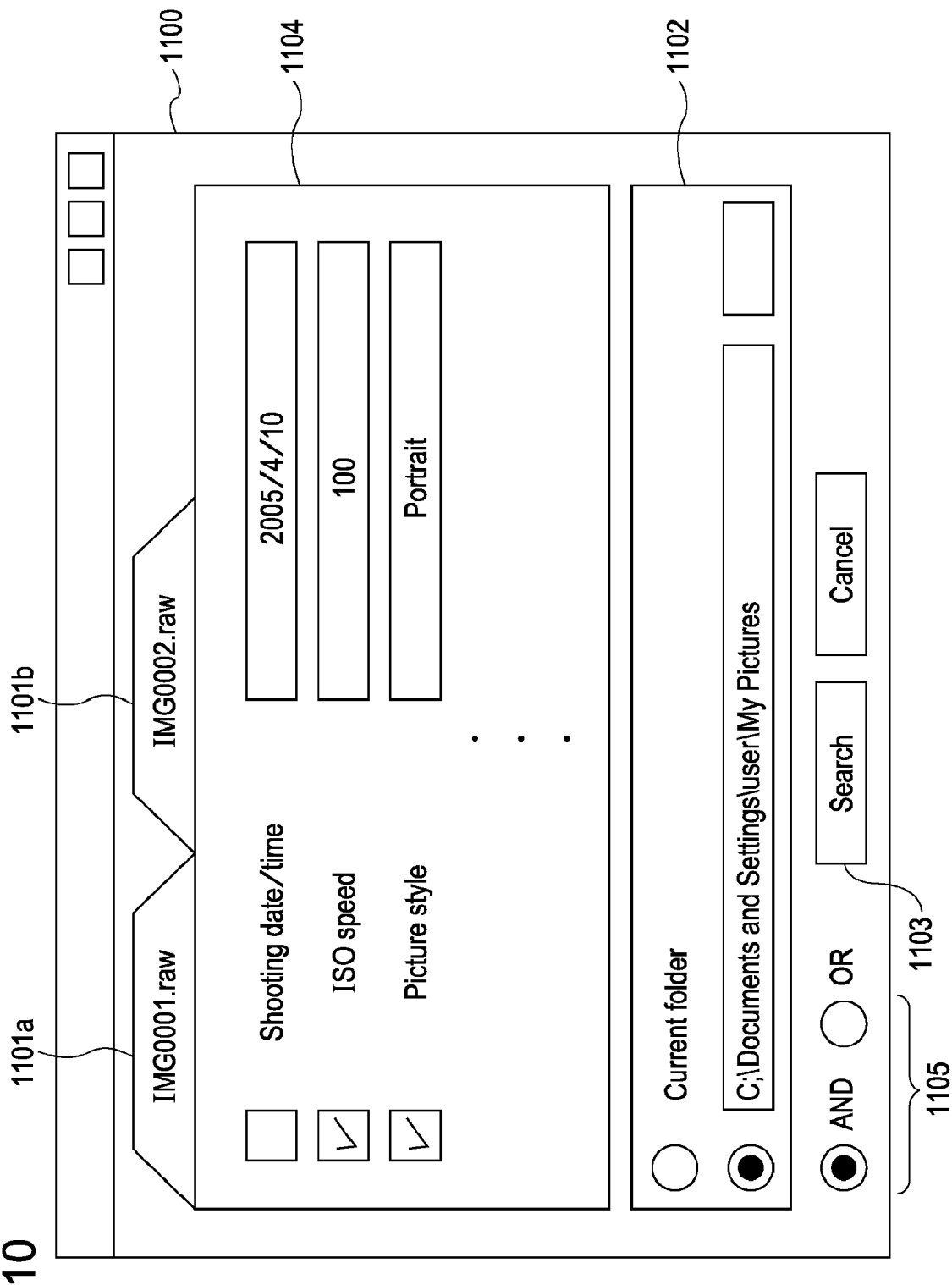
FIG. 10 is an illustration of an example of a search-condition setting window for searching that is executed using two RAW images as reference images.

FIG. 10 is an illustration of an example of a search-condition setting window for searching that is executed using two RAW images as reference images. In a search-condition input section 1104 of a search-condition setting window 1100, a search-condition tab 1101a and a search-condition tab 1101b associated with two reference images are provided. Furthermore, a logical-expression specifying section 1105 for specifying "AND" searching or "OR" searching is provided. Other parts are similar to the corresponding parts of the search-condition setting window 1000 illustrated in FIG. 8, and search conditions can be set in similar manners.

Referring back to FIG. 4, in step S5, a JPEG-image menu is displayed. That is, when a JPEG image has been selected by right-clicking from the plurality of images displayed in the image display section 302, a JPEG-image menu 500 is displayed beside the JPEG image, as illustrated in FIG. 11. The JPEG-image menu 500, similar to the RAW-image menu 400 illustrated in FIG. 6, includes "Search", "Search for pre-processing RAW image", and "Search for pre-editing or post-editing JPEG images" as well as ordinary menu items such as "cut", "copy", and "paste". "Search" allows the user to set search conditions using the attached information of the JPEG image selected by right-clicking, thereby searching for JPEG images satisfying the search conditions. "Search for pre-processing RAW image" is used to search for a pre-processing RAW image corresponding to the JPEG image selected by right-clicking. "Search for pre-editing or post-editing JPEG images" is used to search for images obtained by editing the JPEG image selected by right-clicking or to search for an original pre-editing JPEG image when the image selected by right-clicking is an image obtained by editing the original JPEG image and saving the edited image as a new file.

Returning to FIG. 4, in step S6, it is determined which option in the JPEG-image menu 500 has been selected by the user. At this point, the same processing as described above with respect to step S3 occurs in step S6 with respect to when "Search" or "Others" is selected. The process proceeds to step S15 when "Search for pre-processing RAW image or Search for pre-editing or post-editing JPEG images" is selected.

In step S15, a determination is made whether the search is for pre-processing RAW image. The process proceeds to step S7 when "Search for pre-processing RAW image" was selected in step S6, and proceeds to step S16 when "Search for pre-editing or post-editing JPEG images" was selected in step S6.

Whether the specified image is an image obtained by processing a RAW image, an edited image, or an unedited image can be determined using information contained in the file. When a JPEG-image menu is displayed in step S5, the CPU 104 searches the information in the JPEG file loaded in the RAM 106, and determines an option to be included in the menu. For example, when the selected JPEG image is an image obtained by rotation, "Search for pre-editing or post-editing JPEG images" is included in the menu. Alternatively, a more specific menu item may be included, such as "Search for pre-rotation JPEG image". The information regarding editing, contained in the file, is, for example, header information, but may be other attribute information. Also, the information may be information contained in another file instead of information contained in the image file.

Examples of types of editing include resizing, dust removal, color conversion, trimming, rotation, editing of user's comment, and editing of check marks. "Search for pre-editing or post-editing JPEG images" is used to search for images in corresponding relationships between pre-editing and post-editing versions relating to these types of editing.

In step S7, from a plurality of RAW images stored in the storage unit 102, a pre-processing RAW image corresponding to the JPEG image selected by right-clicking is searched for. When searching for a pre-processing RAW image, an ID uniquely identifying the RAW image, existing in the selected JPEG file, is extracted, and a RAW image having a matching ID is searched for from the RAW images stored in the storage unit 102. Then, in step S8, a result of searching is displayed as shown in FIG. 12.

Figure 12:
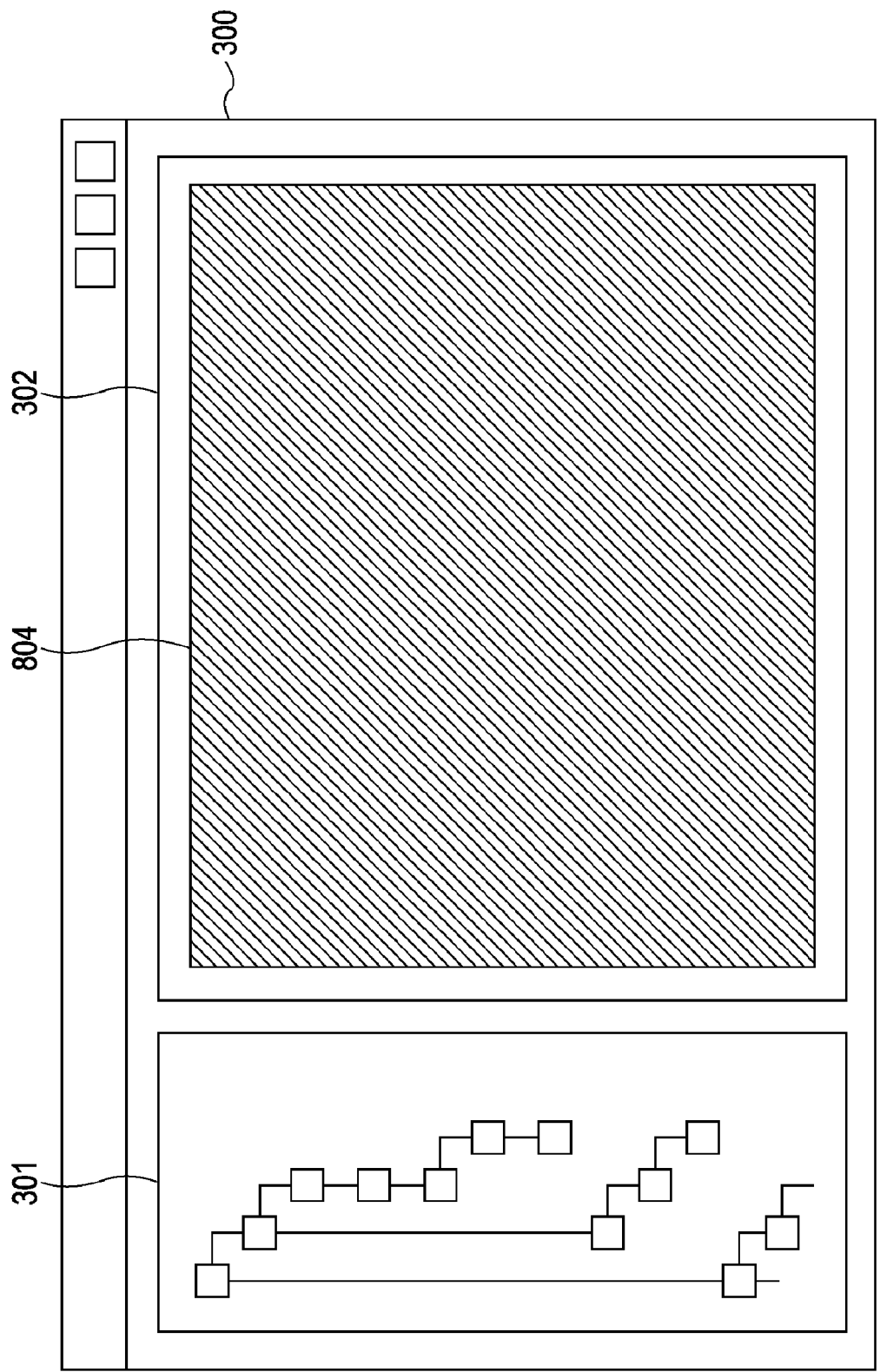
FIG. 12 is an illustration of a screen illustrating a result of searching for a pre-processing RAW image.

FIG. 12 is an illustration of the screen 300 showing a result of searching for a pre-processing RAW image. In the image display section 302 of the screen 300, a pre-processing RAW image 804 is displayed as a result of searching. Since only one pre-processing RAW image corresponds to the JPEG image selected by right-clicking, only the pre-processing RAW image 804 is displayed on the image display section 302 so as to facilitate a processing operation. Following step S8, the process returns to step S0.

Next, in a case where a JPEG image has been selected by right-clicking and "Search" has been selected, the process proceeds from step S6 to step S12. In step S12, a search-condition setting window is displayed based on the attached information of the JPEG image selected by right-clicking. The user is prompted to set search conditions using the search-condition setting window, and JPEG images satisfying the search conditions are searched for.

Figure 13:
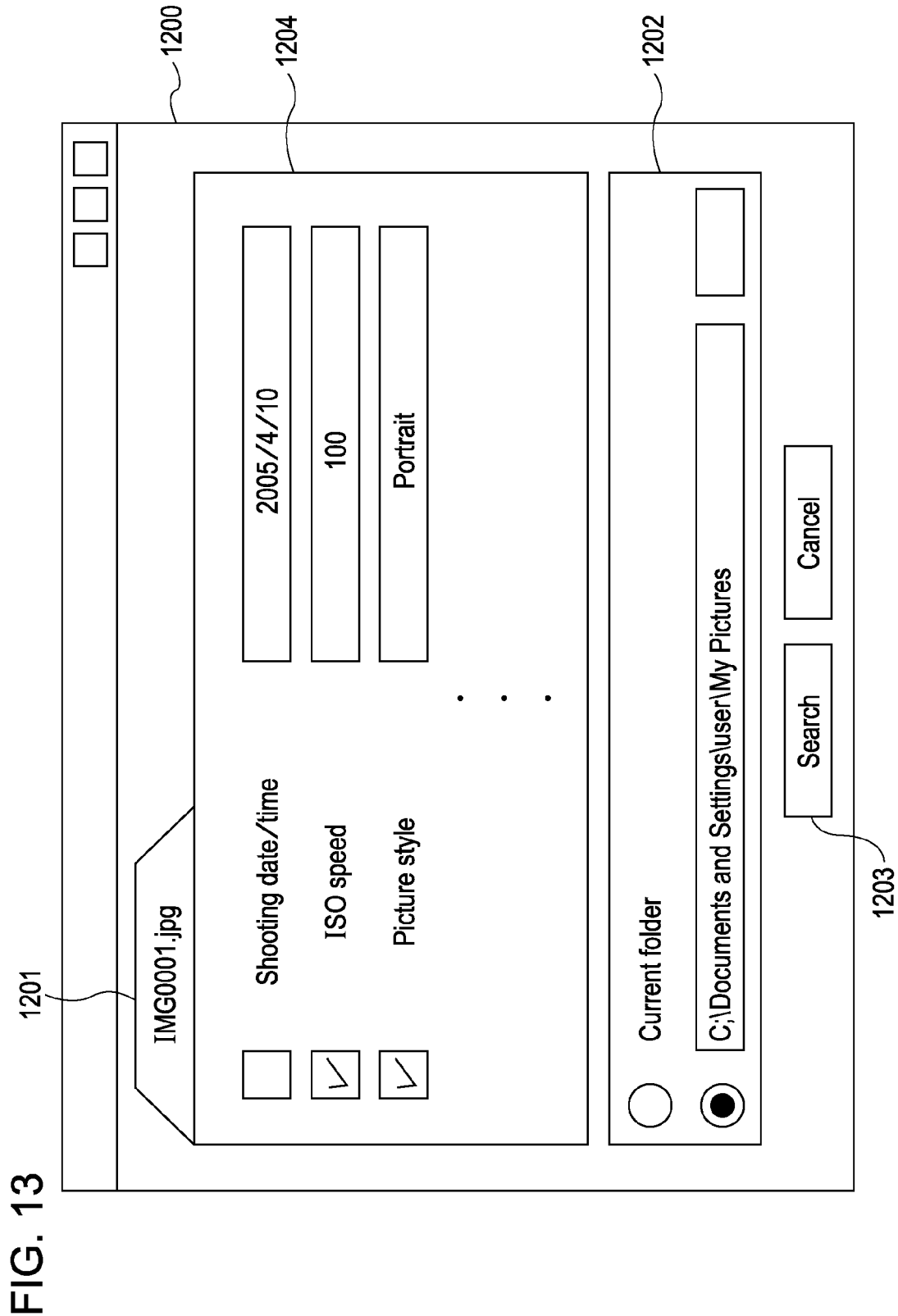
FIG. 13 is an illustration of an example of a search-condition setting window for searching that is executed using a JPEG image as a reference image.

FIG. 13 is an illustration of an example of a search-condition setting window 1200 for searching that is executed using a JPEG image as a reference image. In the search-condition setting window 1200, a file name (IMG0001.jpg) of the JPEG image serving as a reference image appears on a search-condition tab 1201. In a search-condition input section 1204, search conditions and search values are written based on the attached information of the JPEG image. The user sets search conditions by changing the search values or checking checkboxes in the search-condition input section 1204. Furthermore, in a search-folder specifying section 1202, a folder that is to be searched is specified. That is, it is specified whether the current folder is to be searched or an arbitrarily specified folder is to be searched.

When a search start button 1203 is selected, searching is executed in the search range specified in the search-folder specifying section 1202 using the search conditions set in the search-condition input section 1204.

Referring back to FIG. 4, when "folder" is selected in step S1, the process proceeds to step S9 in FIG. 5A, where a folder menu is displayed. That is, when one of the plurality of folders displayed in the explorer section 301 is selected by right-clicking, a folder menu 600 illustrated in FIG. 14 is displayed beside the folder.

The folder menu, similar to the RAW-image menu 400 illustrated in FIG. 6, includes "Search for unprocessed RAW images" as well as ordinary menu options such as "cut", "copy", and "paste". "Search for unprocessed RAW images" is used to search for unprocessed RAW images from RAW images existing in the folder selected by right-clicking.

Turning back to FIG. 5A, in step S10, it is determined which option in the folder menu 600 has been selected. The process proceeds to step S11 when "Search for unprocessed RAW images" is selected, and proceeds to step S14 when any other option is selected.

Figure 15:
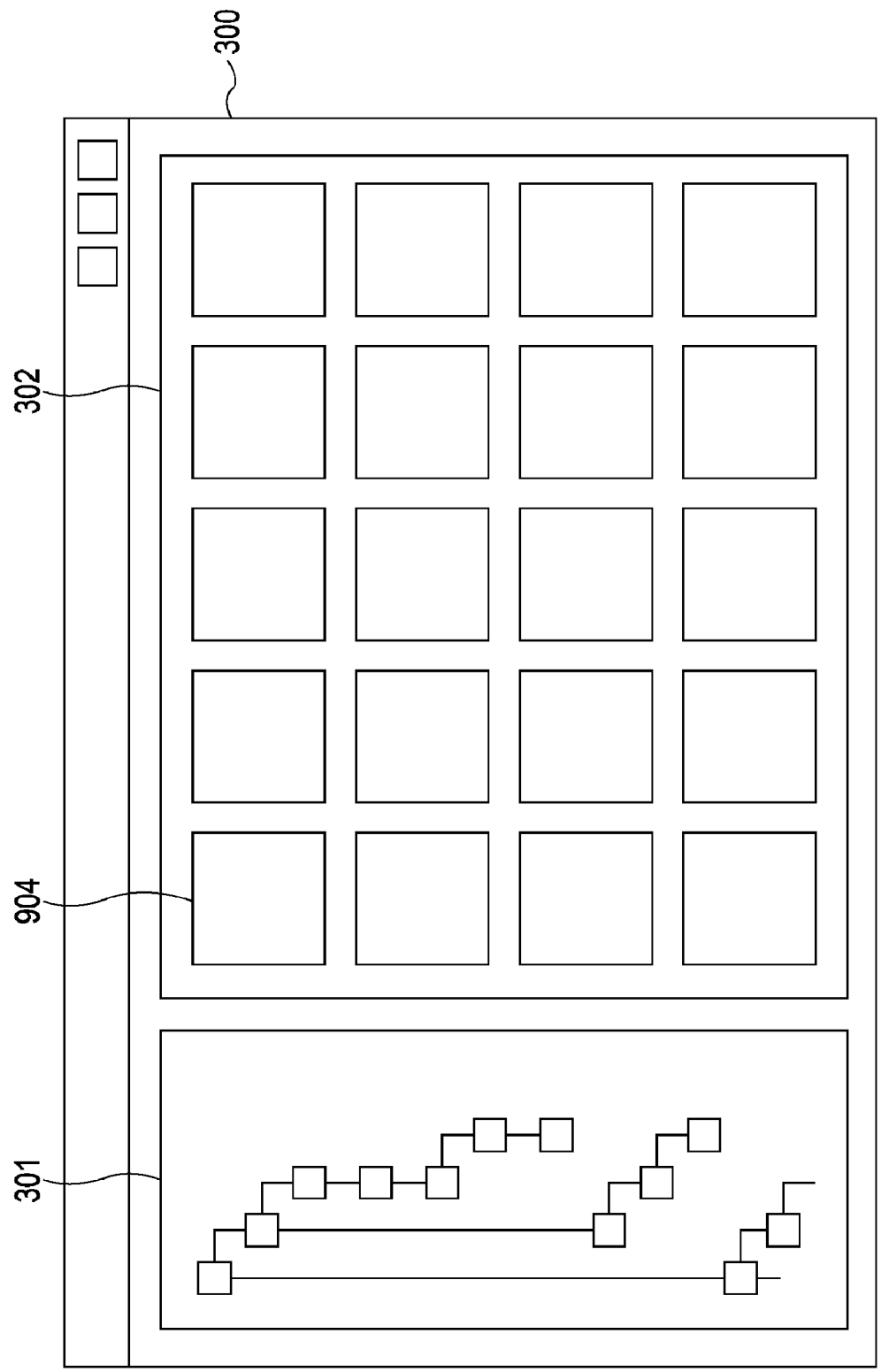
FIG. 15 is an illustration of a screen illustrating results of searching for unprocessed RAW images.

In step S11, unprocessed RAW images are searched for from RAW images existing in the folder selected by right-clicking. Then, in step S8, the search results are displayed as illustrated in FIG. 15. In the image display section 302 of the screen 300, a catalog of unprocessed RAW images 904 representing the search results is displayed. Next, the process returns to step S0.

Returning to FIG. 4, as discussed above, in step S1 it is determined whether the item selected by right-clicking is a RAW image, a JPEG image, or a folder. However, the distinction need not necessarily involve a JPEG image. For example, distinction may be made among a RAW image, an image obtained by processing a RAW image, and a folder. As described earlier, images obtained by processing RAW images may be in various formats, such as BMP, TIFF, and PICT, and the present invention can be applied to images in formats other than JPEG. Thus, in addition to "Search for post-processing JPEG images", the following options can be included as needed in the RAW-menu 400 illustrated in FIG. 6:

"Search for post-processing BMP images"
"Search for post-processing TIFF images"
"Search for post-processing PICT images"
"Search for post-processing images in all formats"

Also, in step S16 of FIG. 4, instead of searching for pre-editing or post-editing JPEG images corresponding to a JPEG image selected by right-clicking, pre-editing or post-editing images in other formats may be searched for. Searching for other JPEG images or images in other formats corresponding to the same pre-processing RAW image can also be performed. Since other JPEG images or images in other formats corresponding to the same pre-processing RAW image all have the same ID, assuming that an ID uniquely identifying the RAW image has been assigned by the method described earlier, the searching can be achieved by searching for images with IDs matching the ID uniquely identifying the RAW image. Thus, for example, the following items can be added as needed to the JPEG menu:

"Search for pre-editing or post-editing BMP images"
"Search for pre-editing or post-editing TIFF images"
"Search for pre-editing or post-editing PICT images"
"Search for pre-editing or post-editing images in all formats"

In another example, the following items can be added as needed to the JPEG menu:

"Search for other JPEG images corresponding to the same pre-processing RAW image"
"Search for other BMP images corresponding to the same pre-processing RAW image"
"Search for other TIFF images corresponding to the same pre-processing RAW image"
"Search for other PICT images corresponding to the same pre-processing RAW image"
"Search for other images in all formats corresponding to the same pre-processing RAW image"

As described above, it is possible to search for images while browsing images on an image display device. That is, instead of using a data searching device dedicated for image searching as in the related art, the present embodiment makes it possible to search for images from a screen displayed on the image display device.

In addition, as described above, searching can be performed even when a search target image and a search reference image have different data formats. That is, when an image or a folder has been selected, by switching menus in accordance with the type of the selected item, searching can be performed even when the search target image and the search reference image have different data formats.

By switching menus in accordance with the type of the selected item based on the corresponding relationship between a RAW image and JPEG images obtained by converting the RAW images or corresponding relationship between pre-editing and post-editing images, searching for mutually corresponding images as well as similar images can be performed.

Second Exemplary Embodiment

In the first exemplary embodiment described above, menu options include "Search", "Search for post-processing JPEG images", "Search for pre-processing RAW image", "Search for pre-editing or post-editing JPEG images", and "Search for unprocessed RAW images" in addition to ordinary options, as illustrated in FIGS. 6, 11, and 14. In the second exemplary embodiment, the user can add or remove menu options as needed. For example, presume the user often selects and right-clicks on "Search" from menu options after selecting an image and searching using only the shooting date/time in the search-condition setting window. In this case, it is very labor intensive for the user to perform a series of tasks of selecting a reference image, selecting "Search", and setting the search condition in the search-condition setting window.

In order to make it easier for the user, in the present embodiment, the user is able to add an option, such as "Search for JPEG images shot on the same date", to menu options that are displayed when an image is selected and right-clicked thereon, as illustrated in FIG. 16. This reduces the number of operations that the user needs to perform for searching.

Other Exemplary Embodiments

The features of the present invention can also be achieved by providing a system or apparatus with a storage medium storing program code of software implementing functions of the embodiments described above. A computer (CPU or MPU) of the system or apparatus can achieve the functions of the above described embodiments by reading and executing the program code stored on the storage medium. In this case, the functions of the embodiments are implemented by the program code read from the storage medium, so that the storage medium storing the program code falls within the scope of the present invention. The storage medium for supplying the program code may be, for example, a floppy disk, a hard disk, an optical disk, a magneto-optical disk, a CD-ROM, a CD-R, a magnetic tape, a non-volatile memory card, or a ROM.

Instead of achieving the functions of the embodiments through execution of the program code by a computer, an OS (Operating System) running on the computer may execute part of or the entire processing according to instructions in the program code, thereby achieving the functions of the above described embodiments. This also falls within the scope of the present invention.

Furthermore, the program code read from the storage medium may be written to a memory of a function extension board mounted on the computer or a function extension unit connected to the computer so that a CPU or the like of the function extension board or the function extension unit can execute part of or the entire processing according to the program code, thereby achieving the functions of the embodiments. This also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-373444 filed Dec. 26, 2005, which is hereby incorporated by reference herein in its entirety.

What is claimed is:

1. An image processing apparatus operable with an image display device, the image processing apparatus comprising:
   a first display unit configured to display a catalog of a plurality of images on the image display device;
   an obtaining unit configured to obtain information when at least one image is selected from the plurality of images displayed on the image display device, the information relating to an image corresponding to the selected image; and
   a second display unit configured to display a first menu on the image display device in association with the selected image, the first menu including an option for executing searching based on the obtained information,
   wherein the information obtained by the obtaining unit includes a data format of the selected image,
   wherein the second display unit displays the first menu on the image display device in association with the selected image, the first menu including an option for executing searching based on the obtained data format, and
   wherein when the data format is a RAW image, the first menu includes an option for searching for a post-processing image corresponding to the selected RAW image, and when the data format of the selected image is a non-RAW image, the first menu includes an option for searching for a pre-processing RAW image corresponding to the selected non-RAW image.

2. The image processing apparatus according to claim 1, further comprising:
   a search executing unit configured to execute searching based on the information when the option for executing searching based on the information has been selected from options included in the first menu; and
   a third display unit configured to display an image detected by the search executing unit on the image display device.

3. The image processing apparatus according to claim 2, wherein the third display unit displays the image detected by the search executing unit on the image display device together with the selected image.

4. The image processing apparatus according to claim 1, wherein the information obtained by the obtaining unit includes information indicating whether an image obtained by editing the selected image exists or whether the selected image is an image obtained by editing another image.

5. The image processing apparatus according to claim 1, wherein the information is obtained either from the header information, other attribute information, or both of the selected image.

6. The image processing apparatus according to claim 1, wherein the first display unit displays the catalog of the plurality of images on the image display device and a plurality of folders containing the plurality of images on a same screen of the image display device, and wherein when the at least one image is selected from the plurality of images displayed on the image display device, the second display unit displays the first menu on the image display device in association with the selected image, and when one of the plurality of folders displayed on the image display device is selected, the second display unit displays a second menu on the image display device, the second menu including an option for executing searching based on the selected folder.

7. The image processing apparatus according to claim 6, further comprising a setting unit configured to add a new option for executing searching to either the first menu, the second menu, or both, or to remove an option from either the first menu, the second menu, or both.

8. The image processing apparatus according to claim 6, wherein the second menu includes an option for executing searching for an unprocessed RAW image among images contained in the selected folder.

9. The image processing apparatus according to claim 6, wherein the second display unit displays the first menu or the second menu on the screen of the image display device where the selected image or the selected folder is displayed.

10. The image processing apparatus according to claim 1, further comprising a setting unit configured to add a new option for executing searching to the first menu or remove an option from the first menu.

11. A method for controlling an image processing apparatus operable with an image display device, the method comprising:

displaying a catalog of a plurality of images on the image display device;

obtaining information when at least one image is selected from the plurality of images displayed on the image display device, the information relating to an image corresponding to the selected image; and displaying a first menu on the image display device in association with the selected image, the first menu including an option for executing searching based on the obtained information, wherein the information includes a data format of the selected image, wherein, when displaying the first menu, the first menu is displayed on the image display device in association with the selected image, the first menu including an option for executing searching based on the obtained data format, and wherein when the data format is a RAW image, the first menu includes an option for searching for a post-processing image corresponding to the selected RAW image, and when the data format of the selected image is a non-RAW image, the first menu includes an option for searching for a pre-processing RAW image corresponding to the selected non-RAW image.

12. The method according to claim 11, further comprising:
executing searching based on the information when the option for executing searching based on the information has been selected from options included in the first menu; and
displaying an image detected by the searching on the image display device.

13. The method according to claim 12, wherein, when displaying the image detected by the searching, the image detected by the searching is displayed on the image display device together with the selected image.

14. The method according to claim 11, wherein the information includes information indicating whether an image obtained by editing the selected image exists or whether the selected image is an image obtained by editing another image.

15. The method according to claim 11, wherein the information is obtained either from the header information, other attribute information, or both of the selected image.

16. The method according to claim 11,
wherein, when displaying the catalog of the plurality of images, the catalog of the plurality of images is displayed on the image display device and a plurality of folders containing the plurality of images is also displayed on a same screen of the image display device, and
wherein, when displaying the first menu, when the at least one image is selected from the plurality of images displayed on the image display device, the first menu is displayed on the image display device in association with the selected image, and when one of the plurality of folders displayed on the image display device is selected, a second menu is displayed on the image display device, the second menu including an option for executing searching based on the selected folder.

17. The method according to claim 16, further comprising a setting unit configured to add a new option for executing searching to either the first menu, the second menu, or both, or to remove an option from either the first menu, the second menu, or both.

18. The method according to claim 16, wherein the second menu includes an option for executing searching for an unprocessed RAW image among images contained in the selected folder.

19. The image processing method according to claim 16, wherein, when displaying the first menu or the second menu, the first menu or the second menu is displayed on the screen of the image display device where the selected image or the selected folder is displayed.

20. The method according to claim 11, further comprising adding a new option for executing searching to the first menu or removing an option from the first menu.

21. A non-transitory computer-executable storage medium storing computer-executable process steps, the computer-executable process steps causing a computer to execute the method of claim 11.

* * * * *